United States Patent [19]

Mamers et al.

[11] 4,224,102
[45] Sep. 23, 1980

[54] REMOVAL OF BITUMEN FROM WASTE PAPER

[75] Inventors: Heikki Mamers, Seaford; David N. J. Menz, Edithvale, both of Australia

[73] Assignee: Commonwealth Scientific and Industrial Research Organization, Campbell, Australia

[21] Appl. No.: 928,333

[22] Filed: Jul. 27, 1978

[30] Foreign Application Priority Data

Jul. 27, 1977 [AU] Australia .............................. 0997/77

[51] Int. Cl.³ ............................................ D21B 1/32
[52] U.S. Cl. ............................................ 162/5; 162/8
[58] Field of Search ........................... 162/4, 5, 6, 7, 8; 209/3

[56] References Cited

U.S. PATENT DOCUMENTS

| | | | |
|---|---|---|---|
| 2,959,513 | 11/1960 | Savage | 162/8 |
| 4,013,505 | 3/1977 | Balcar et al. | 162/5 |
| 4,076,578 | 2/1978 | Puddington et al. | 162/5 |

OTHER PUBLICATIONS

Condensed Chemical Dictionary, 8th Ed. VanNostrand NY, NY 1974, p. 936, 118.

Primary Examiner—William F. Smith
Attorney, Agent, or Firm—Sughrue, Rothwell, Mion, Zinn and Macpeak

[57] ABSTRACT

In the recycling of wastepaper, paper products containing significant quantities of bitumen are treated to remove the bitumen prior to manufacture of new cellulosic products from the recycled stock. The process involves heating the reslushed wastepaper stock in the presence of a hydrophobic (plastic) material at a temperature greater than the softening point of the bitumen. During the heating, the system is agitated and a surface active agent is optionally added. The hydrophobic material takes up the bitumen and is separated from the wastepaper stock.

9 Claims, 1 Drawing Figure

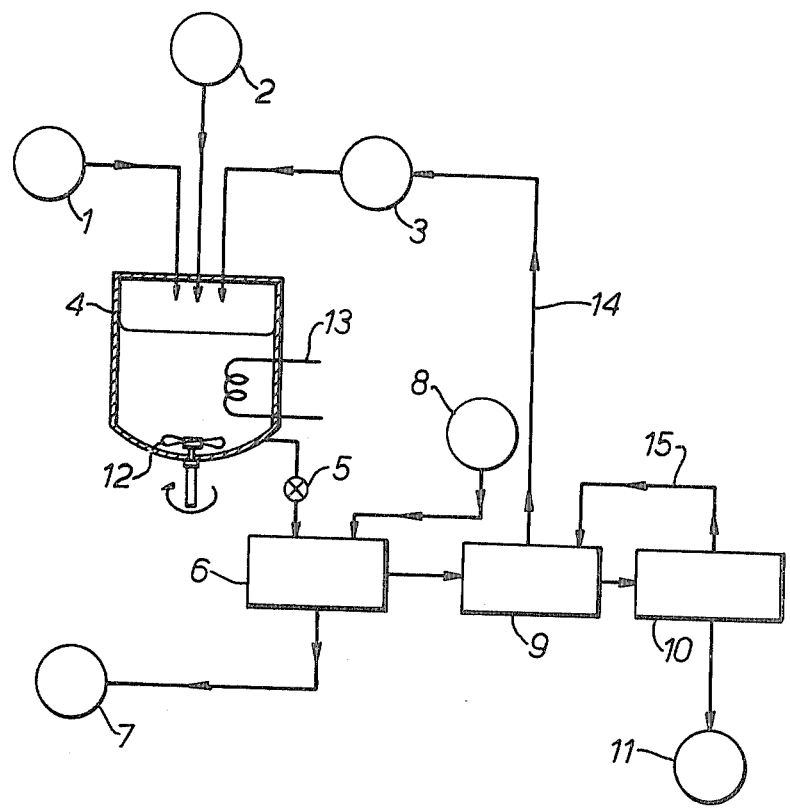

REMOVAL OF BITUMEN FROM WASTE PAPER

This invention relates to the recycling of wastepaper and is particularly concerned with the removal of bitumen from reslushed wastepaper stock.

Bitumen is used as a waterproofing agent for certain types of cellulosic packaging materials and also as a hot melt adhesive in the fabrication of certain types of boxes and other containers.

The presence of substantial quantities of bitumen in paper products presents considerable problems in the reuse of the paper. Besides discolouring the reslushed paper stock, the bitumen further contaminates the paper-or paperboard-making machinery during the subsequent manufacture of cellulosic products from the recycled stock. Thus, the bitumen blocks the paper machine felts and wires, fouls the surfaces of the drying cylinders and interferes with the smooth operation of the cutter knives in the subsequent rewinding and slitting operations.

In present paper mill practice, bitumen or asphalt containing paper is excluded as far as possible from the recycled paper stream. Any bitumen which does enter the recycled stock stream is dispersed in a "debituminizer" which breaks the bitumen into small fragments. These small fragments are less harmful to the paper machine operations and in the subsequent product than larger fragments of bitumen coated material.

The aim of the invention is therefore to provide a method for substantially removing bitumen from bitumen-containing, reslushed wastepaper stock. This either permits re-use of more heavily bitumen-contaminated wastepaper than can be utilized with existing methods or, alternatively, serves as a means of reducing the bitumen content of existing wastepaper furnishes.

According to the present invention there is provided a method for removing bitumen from bitumen-containing reslushed wastepaper stock, which method comprises agitating the stock in the presence of a solid hydrophobic material at a temperature above the softening point of the bitumen and thereafter separating the thus produced bitumen-associated hydrophobic material from the wastepaper stock.

The wastepaper stock is separated from the bitumen-associated hydrophobic material by known means to give a wastepaper stock stream of reduced bitumen content and a hydrophobic material completely or partially coated with bitumen. The bitumen associated hydrophobic material may then be discarded as process waste or, alternatively, the bitumen may be removed from the hydrophobic material by known means and the hydrophobic material recycled for re-use by the method of the present invention.

The process of adhesion of the bitumen to the hydrophobic material may be further enhanced by the presence of surface active agents in the hot, water-slurried stock. Dissolved materials of an acidic, alkaline or neutral nature may also be present in the water associated with the wastepaper stock.

The reslushed, bitumen-containing wastepaper stock for the practice of the present invention may be derived by any known means. The exact method used to reslush the bitumen-containing wastepaper is not critical, the preferred requirement for the practice of the present invention being that the wastepaper stock is obtained in a substantially defibrated form.

Preferred aspects of the invention will now be described with reference to the accompanying drawing which depicts a schematic representation of a system for removing bitumen from reslushed wastepaper stock.

Referring to the drawing, the bitumen-containing wastepaper stock enters the system at 1 and is charged to the contactor vessel 4. The contactor vessel 4 is of a construction suitable to withstand the temperature, pressure and chemical conditions pertaining to the practice of the invention. The contactor vessel may be adapted for a batch or continuous operation and may be of a closed or open nature. This does not affect the principle of the invention.

In batchwise operation, the bitumen-containing wastepaper stock from 1 is charged directly into the contactor vessel 4. The proportion of wastepaper solids to water in the contactor vessel 4 should be such as to permit ready agitation of the contents of the contactor vessel. In practical terms, 1 to 5 weight percent of wastepaper solids in the slurry charged to the contactor vessel 4 has been found suitable for the practice of the present invention, although the method of the invention does not preclude the use of wastepaper slurries containing higher or lower percentages of wastepaper solids.

The water associated with the bitumen-containing wastepaper stock may also contain dissolved chemicals as a result of the method initially used for slurrying and defibrating the wastepaper. If dissolved chemicals are present, these chemicals do not have to be removed from the wastepaper stock slurry prior to the practice of the present invention.

An essential feature of the present invention is that the bitumen-containing wastepaper slurry in the contactor vessel 4 be maintained at a temperature at or above the softening point of the bitumen during the operation of the invention.

If necessary, the contents of the contactor vessel 4 may be further heated by any known means such as electrical heating, steam heating or flame heating, either directly or indirectly. The method adopted for heating the wastepaper slurry and maintaining the slurry temperature at or above the softening point of the bitumen during the practice of the invention is not critical to the success of the invention, although a preferred method of heating the wastepaper slurry is by the direct injection of live steam.

If heating of the bitumen-containing wastepaper slurry is required, the heating may be performed before, during or after the addition of the hydrophobic material and surface active agent as described below.

Another essential feature of the present invention is the addition of solid hydrophobic material to the bitumen-containing wastepaper slurry in the contactor vessel 4. Suitable hydrophobic materials include the commonly used materials known as "plastics". Examples of these include poly-olefins, polystyrene and polyhalocarbons, either singly or in combination. The primary requirement of the hydrophobic material is to provide a surface for adhesion for the bitumen particles during the practice of the invention.

The solids hydrophobic material may be added in any suitable geometric or irregular form. A preferred requirement of shape and size for the hydrophobic material is that the material can eventually be readily separated from the wastepaper stock at the end of the processing period of the present invention. Hence, very small fragments of hydrophobic material should be avoided as these will be difficult to segregate from the cellulosic fibres.

The quantity of solid hydrophobic material to be added to the contactor vessel 4 is directly related to the amount of bitumen initially present in the wastepaper stock and the proportion of the bitumen to be removed during the processing. Thus, for instance, heavily bitumen contaminated stock will require a larger amount of hydrophobic material for bitumen removal than a more lightly contaminated stock and so on.

Another factor influencing the weight of hydrophobic material required for a given bitumen removal duty is the form of the hydrophobic material. The method of the present invention allows a relatively thin layer of bitumen to adhere to the surface of the hydrophobic material. Hence, hydrophobic material with a high specific area will be more effective in terms of bitumen removal per unit weight than the same material in a form having a lower specific area. For example, polyethylene in the form of a sheet say 0.1 mm thick will remove more bitumen per gram of polyethylene charged than if the same polyethylene were charged in the form of spheres say 20 mm in diameter.

Taking the above factors into consideration, it becomes difficult to specify with any precision the weight of hydrophobic material required to remove a given weight of bitumen. However, in general terms, it is unlikely that the weight of hydrophobic material charged to the contactor vessel 4 need be more than fifteen times the weight of bitumen charged to the contactor vessel 4 and in most instances, will be less.

The hydrophobic material may be added to the contactor vessel 4 as a separate stream 3 as indicated in FIG. 1. Alternatively, some or all of the hydrophobic material may be introduced together with the bitumen-containing wastepaper stock. For example, if the initial wastepaper feed material contains both bituminized paper and say plastic coated board, slushing this feed will give a mixture containing both bitumen fragments and plastic film. In this instance, further hydrophobic material addition may be unnecessary provided that sufficient plastic film is present to subsequently remove the required amount of bitumen.

A further desirable feature in the method of the present invention is the addition of surface active agents from source 2 to the wastepaper stock and hydrophobic material in the contactor vessel 4. The presence of surface active agents has been found to facilitate the adhesion between the bitumen fragments and the hydrophobic material and hence give more efficient use of the hydrophobic material. Suitable surface active agents include, but are not limited to, fatty acid soaps such as sodium stearate and sodium oleate and synthetic detergents such as BP "Comprox" and Atlas "Span 20". The quantity of surface active agents required is not large and is unlikely to exceed 3 percent by weight of the original wastepaper solids charged to contactor vessel 4.

After charging the contactor vessel 4 with the bitumen-containing wastepaper stock, the hydrophobic material and, if desired, the surface active agent and raising or maintaining the temperature of the contents of the contactor vessel above the softening point of the bitumen by heater means 13, the contents of the contactor vessel are then further agitated. The agitation may be by any known means such as by a mechanical agitator 12 or by the injection of air or gas.

During the agitation period, the softened bitumen fragments contact and adhere to the hydrophobic material, thus forming a layer of bitumen upon the surfaces of the hydrophobic material. The agitation must be of such a nature as to give intimate mixing of the wastepaper stock and the hydrophobic material but should not be so violent as to bring about significant attrition of the hydrophobic material. Attrition of the hydrophobic material will cause difficulties in the subsequent separation of the hydrophobic material from the treated wastepaper stock.

The period of agitation required for the practice of the invention will be determined by the degree of bitumen removal required. For a given quantity of hydrophobic material and bitumen fragments, prolonging the period of agitation will generally give some increase in the amount of bitumen adhering to the hydrophobic material. However, in practical terms, it is unlikely that the period of agitation will exceed 2 hours.

It is important that the temperature of the contents of the contactor vessel be maintained at or above the softening point of the bitumen during the agitation period. If the temperature of the contents of the contactor vessel drops below the softening point of the bitumen, then the process of adhesion between the dispersed bitumen fragments and the hydrophobic material will effectively cease and no more bitumen will be transferred from the stock suspension to the surfaces of the hydrophobic material.

At the end of the agitation period, the temperature of the contents of the contactor vessel 4 may be lowered below the softening point of the bitumen by means such as the further addition of cold water. This has the advantage of hardening the bitumen layer adhering to the surfaces of the hyrophobic material and prevents redispersion of the bitumen layer during the subsequent processing operations. Alternatively, as indicated in FIG. 1, cold water from source 8 may be mixed with the treated wastepaper stock subsequent to discharge from the contactor vessel 4. Although not essential, cooling of the treated wastepaper stock at the end of the agitation to a temperature below the softening point of the bitumen is a preferred feature of the method of the invention.

Referring to FIG. 1, the treated wastepaper stock and bitumen-coated hydrophobic material is discharged from the contactor vessel 4 through a valve 5 and is mixed with cold water from source 8 at the entry of the screen 6. The screen 6 separates the larger bitumen-coated hydrophobic material from the smaller cellulosic fibres. The screen 6 may be of any suitable known design. The screen accepts stream 7 represents the bitumen reduced wastepaper stock which is the product of the process. Stream 7 then proceeds to the further manufacture of cellulosic materials by known methods.

The rejects from screen 6 are primarily composed of bitumen coated hydrophobic material. These rejects may be discarded as a process waste. Alternatively, the bitumen may be stripped from the hydrophobic material by the use of organic solvents in the stripper unit 9. The stripped hydrophobic material is then returned via line 14 to the contactor vessel 4 for re-use in the next bitumen removal cycle.

The bitumen-containing organic solvent from stripper 9 may be further treated in the recovery unit 10 to give a solvent recycle stream 15 to the stripper 9, and a bitumen stream 11. The bitumen stream 11 then represents a secondary product from the method of the present invention.

The method of the present invention is further illustrated by the following specific examples:

EXAMPLE 1

The presence of surface active agents has a significant effect upon the rate of adhesion of the bitumen to the hydrophobic material. In the series of runs summarized below the Table 1, the original wastepaper stock had a bitumen content of 12.1 weight %. The wastepaper stock was obtained at 2% total solids concentration and, as a result of previous reslushing operations, had a dissolved caustic soda concentration of 0.2 g/l caustic soda in the water associated with the stock. The hydrophobic material added was polypropylene in the form of beads having a specific area of 1450 mm²/g. The amount of polypropylene beads added was 5 times by weight the amount of bitumen present.

The agitation of the wastepaper stock and beads was for 15 minutes at 80° C. for each run. The softening point of the bitumen in the wastepaper stock was 67° C.

As can be seen from Table 1, the surface active agents significantly improved the extent of bitumen adhesion to the polypropylene beads. Thus, for instance, in Run A with no surface active agent present the amount of bitumen adhering to the polypropylene beads was 41.5 weight % of the bitumen originally present. In Run B, this was increased to 82.5 wt % by the addition of 2.1 wt % of sodium stearate base upon the total weight of wastepaper solids present. Improvements in the adhesion of bitumen to the polypropylene beads were also obtained relative to Run A when the agitation was performed in the presence of sodium oleate (Run C), BP "Comprox" (Run D) and Atlas "Span 20" (Run E).

TABLE 1
EFFECT OF SURFACE ACTIVE AGENTS ON THE REMOVAL OF BITUMEN FROM WASTEPAPER STOCK

| RUN | SURFACE ACTIVE AGENT | WT.% SURFACE ACTIVE AGENT RELATIVE TO WASTEPAPER SOLIDS | WT.% OF BITUMEN IN FEED STOCK ADHERING TO BEADS |
|---|---|---|---|
| A | None | None | 41.5 |
| B | Sodium Stearate | 2.1 | 82.5 |
| C | Sodium Oleate | 2.3 | 78.3 |
| D | B.P. "Comprox" | 2.1 | 69.1 |
| E | Atlas "Span 20" | 2.1 | 72.8 |

The bitumen adhering to the beads was removed together with the beads at the end of each run.

EXAMPLE 2

A wide variety of hydrophobic materials may be used as substrates for bitumen adhesion. Table 2(a) (below) describes the characteristics of a number of different substrates and Table 2(b) (below) summarizes the results obtained using these substrates.

The wastepaper stock contained 12.1 weight % bitumen and, as in Example 1, was obtained at 2 weight % solids consistency with 0.2 g/l caustic soda dissolved in the water. Sodium stearate in an amount corresponding to 2.1 weight % of the total wastepaper solids are used as the added surfactant. The agitations were for a period of 15 minutes. The agitation temperature was 80° C. for Runs F to I and 70° C. for Run J.

TABLE 2(a)
CHARACTERISTICS OF HYDROPHOBIC SUBSTRATES USED FOR BITUMEN REMOVAL

| RUN | HYDROPHOBIC SUBSTRATE | SPECIFIC AREA OF HYDROPHOBIC MATERIAL (mm²/g) | WT. OF HYDROPHOBIC MATERIAL ADDED: WT. OF BITUMEN PRESENT |
|---|---|---|---|
| F | Polyethylene beads | 1,840 | 3.9:1 |
| G | Polyethylene sheet | 24,700 | 0.87:1 |
| H | P.T.F.E. beads | 590 | 12.3:1 |
| I | Polypropylene sheet | 56,600 | 0.50:1 |
| J | P.V.C. beads | 820 | 8.8:1 |

TABLE 2(b)
EFFECTS OF HYDROPHOBIC SUBSTRATES ON BITUMEN REMOVAL FROM WASTEPAPER STOCK

| RUN | HYDROPHOBIC SUBSTRATE | WT. % OF BITUMEN IN FEEDSTOCK ADHERING TO HYDROPHOBIC MATERIAL |
|---|---|---|
| F | Polyethylene beads | 46.5 |
| G | Polyethylene sheet | 88.8 |
| H | P.T.F.E. beads | 78.2 |
| I | Polypropylene sheet | 83.1 |
| J | P.V.C. beads | 76.7 |

As can be seen from Table 2(b), significant adhesion of bitumen on to the hydrophobic material was obtained in all instances. The hydrophobic materials together with the adhering bitumen were removed from the treated wastepaper stock at the end of the agitation period.

EXAMPLE 3

Prolonging the agitation period gives some increase in the amount of bitumen transferred from the stock suspension to the hyrophobic material. In Run K the agitation period was 15 minutes and in Run I, the agitation period was 30 minutes. Both runs were at 80° C. with a 2% consistency wastepaper stock suspension. The bitumen content was 12.1 weight % of the total stock solids. Polypropylene beads of 1450 mm²/g specific area were used in the proportion of 2.5 parts by weight of beads per unit weight of bitumen present. No surface active agents were added. The results of the two runs are summarized in Table 3 (below).

TABLE 3
EFFECTS OF AGITATION TIME ON THE ADHESION OF BITUMEN TO POLYPROPYLENE BEADS

| RUN | TIME OF AGITATION (MINS) | WT. % OF TOTAL BITUMEN ADHERING TO POLYPROPYLENE BEADS |
|---|---|---|
| K | 15 | 21.0 |
| L | 30 | 24.4 |

As can be seen from Table 3, increasing the agitation time from 15 minutes (Run K) to 30 minutes (Run L) increased the percentage of total bitumen adhering to the polypropylene beads from 21.0 wt.% to 24.4 wt. %.

EXAMPLE 4

The temperature at which the bitumen-containing wastepaper stock is held during the agitation period had a considerable effect upon the rate of adhesion of the bitumen to the hydrophobic substrate. At temperatures below the softening point of the bitumen, little or no adhesion occurs between the hydrophobic substrate and the bitumen. Adhesion commences as the temperature of the stock is raised to the softening point of the bitumen and the rate of adhesion further increases as the temperature of the stock is raised beyond the softening point of the bitumen.

The bitumen present in the stock described in this example had a softening point of 67° C. In Run M the stock was agitated with polypropylene beads as the hydrophobic substrate at a temperature of 70° C. Run N was similarly performed at a temperature of 80° C. The wastepaper stock consistency for both runs was 2% solids and the bitumen content was 12.1 wt. % on a solids basis. The quantity of polypropylene beads used in each run was 2.5 times the total weight of bitumen present. The results obtained in Runs M and N are summarized in Table 4 (below).

TABLE 4
EFFECTS OF TEMPERATURE ON THE RATE OF BITUMEN ADHESION TO POLYPROPYLENE BEADS

| RUN | AGITATION TIME (MINS) | STOCK TEMPERATURE DURING AGITATION (°C.) | WT. % OF TOTAL BITUMEN ADHERING TO POLYPROPYLENE BEADS |
|---|---|---|---|
| M | 15 | 70 | 2.3 |
| N | 15 | 80 | 36.6 |

From Table 4, it can be seen that the rate of adhesion between the bitumen and the hydrophobic material increased considerably as the stock temperature during the agitation period was increased from 70° C. (3° C. above the softening point of the bitumen) to 80° C. (13° C. above the softening point).

EXAMPLE 5

Increasing the consistency of the wastepaper solids whilst maintaining a constant ratio of weight of hydrophobic material added: weight of wastepaper solids present increases the number of collisions between the bitumen fragments and the hydrophobic substrate during a given time of treatment at a given agitation rate. The net effect is to increase the overall rate of adhesion of the bitumen to the hydrophobic material. This, in turn, leads to an improved removal of bitumen upon subsequent screening of the product at the end of the processing period.

Run O was with a wastepaper stock of 2% solids consistency containing 12.1 wt. % bitumen on a wastepaper solids basis. Polypropylene beads in the ratio of 5 parts by weight of beads to 1 part by weight of bitumen were added as the hydrophobic material. The agitation period was for 15 minutes at 80° C.

Run P was similar to Run O except that the initial wastepaper stock consistency was 3% rather than 2%. Otherwise, the same processing conditions were employed.

The results of Runs O and P are summarized in Table 5 (below).

TABLE 5
EFFECTS OF INITIAL WASTEPAPER SOLIDS CONSISTENCY ON THE REMOVAL OF BITUMEN USING POLYPROPYLENE BEADS

| RUN | INITIAL STOCK CONSISTENCY (%) | WT. % INITIAL BITUMEN ADHERING TO POLYPROPYLENE BEADS |
|---|---|---|
| O | 2.0 | 36.6 |
| P | 3.0 | 52.5 |

As can be seen from Table 5, increasing the initial wastepaper stock solids consistency from 2% (Run O) to 3% (Run P) increased the quantity of the initially present bitumen adhering to the beads from 36.6% to 52.5%.

EXAMPLE 6

The hydrophobic substrate used for bitumen removal may be included as a component of the original wastepaper furnish and pulped simultaneously with the bitumenized paper or board.

In the present example, the original wastepaper furnish was an equal parts by weight mixture of double sided, polyethylene laminated milk carton board and five ply bitumenized sack furnish. The milk carton board had a total thickness of 0.67 mm and was faced on both sides with a polyethylene film 0.02 mm thick. The weight of polyethylene film corresponded to 10 percent by weight of the milk carton board. The five ply bitumenized sack furnish contained 15.5 weight percent of bitumen.

Thus the wastepaper mixture, as charged to a digester vessel, contained 5 percent by weight of polyethylene film and 7.75 percent by weight of bitumen.

The wastepaper in the digester vessel was submerged in 10 g/l caustic soda solution, the digester sealed and heated to 140° C. under an applied nitrogen gas pressure of 2.1 MPa. The time taken to reach 140° C. from ambient temperature was 8 minutes. The digester contents were then retained for a further 10 minutes at 140° C.

At the end of the digestion period, the pressure in the digester was vented to atmospheric and the contents of the digester discharged into a stirred tank.

The solids content of the bitumen/polyethylene film/paper pulp slurry discharged into the stirred tank was adjusted to 3 percent by weight by the addition of water and sufficient sodium stearate added to give a sodium stearate concentration of 150 ppm in the water present.

The contents of the stirred tank were then heated to 80° C. and agitated for 15 minutes. During this period, the bitumen in the slurry substantially adhered to the polyethylene film originally associated with the milk carton board.

At the end of the 15 minutes agitation period, the contents of the stirred tank were cooled to 60° C. by the addition of cold water. The cooled slurry from the stirred tank was then screened over a slotted screen with a screen opening of 0.35 mm.

The screen rejected the bitumen coated polyethylene film. The pulp in the screen underflow, which represented the product of the process, had a bitumen content of 0.24 percent by weight. This corresponded to a removal of 97.1 weight percent of the bitumen originally present in the wastepaper furnish.

EXAMPLE 7

The present example is concerned with a further instance in which the hydrophobic substrate used for bitumen removal was included as an integral part of the original wastepaper furnish.

The original furnish was composed of equal parts by weight of sugar bag stock and bitumenized sack stock.

The sugar bag stock comprised of three plys of kraft paper with an inner loose ply of polypropylene film. The polypropylene film was 0.04 mm thick and corresponded to 9 percent by weight of the sugar bag stock. The bitumenized sack stock was of a five ply structure with a bitumen content of 15.5 percent by weight on total solids.

Thus, the wastepaper furnish, as charged to a digester vessel, contained 4.5 weight percent of polypropylene film and 7.75 percent by weight of bitumen.

The wastepaper in the digester vessel was submerged in 10 g/l caustic soda solution. The digester was then sealed, pressurized to 2.1 MPa with nitrogen gas and the digester contents then heated to 120° C. The time taken to reach 120° C. from ambient temperature was 7 minutes. The contents of the digester were then retained at 120° C. for a further 10 minutes.

At the end of the 10 minute digestion period, the pressure of the digester was vented to atmospheric. The contents of the digester were then transferred to a stirred tank and diluted with sufficient water to give a slurry containing a concentration of 3 percent solids. Sufficient sodium stearate was also added to give a sodium stearate concentration of 150 ppm in the water associated with the slurry.

The slurry in the stirred tank was then heated to 80° C. for a period of 15 minutes. During this agitation period, the bitumen present in the slurry substantially adhered to the polypropylene film originally associated with the sugar bag stock.

At the end of the 15 minute agitation period, the contents of the stirred tank were cooled to 60° C. by the addition of cold water. The cooled slurry from the stirred tank was then screened over a slotted screen with a screen opening of 0.35 mm.

The screen rejected the bitumen coated polypropylene film. The paper pulp in the screen underflow, which represented the product of the method of the invention, had a bitumen content of 0.49 weight percent on a dry solids basis. This corresponded to a bitumen removal of 94.1 weight percent of the bitumen originally present in the wastepaper furnish.

We claim:

1. A method for removing bitumen from bitumen-containing reslushed wastepaper stock, which method comprises the steps of (i) agitating the stock in water in the presence of a solid hydrophobic material and a surface active agent at a temperature at or above the softening point of the bitumen, (ii) ceasing the agitation, (iii) lowering the temperature of the mixture below the softening point of the bitumen thus causing the bitumen to adhere to said hydrophobic material, and (iv) separating the thus produced bitumen-associated hydrophobic material from the wastepaper stock.

2. A method as claimed in claim 1, wherein the hydrophobic material is selected from the group consisting of poly-olefins, polystyrene, poly-halocarbons, and mixtures of these.

3. A method as claimed in claim 2, wherein the surface active agent is a fatty acid or a synthetic detergent.

4. A method as claimed in claim 1, wherein the bitumen-containing wastepaper stock contains 1-5 wgt. % of wastepaper solids.

5. A method as claimed in any one of claims 1, 2, 3 or 4, wherein the temperature is achieved by the injection of live steam either before, during or after the addition of the hydrophobic material to the bitumen-containing wastepaper stock.

6. A method as claimed in any one of claims 1, 2, 3 or 4, wherein the quantity of hydrophobic material added does not exceed fifteen times by weight the amount of bitumen initially present in the wastepaper stock and wherein the hydrophobic material is in particles of a sufficiently large size to permit ready separation of the hydrophobic material from the wastepaper stock.

7. A method as claimed in any one of claims 1, 2, 3 or 4 and wherein the separated bitumen-associated hydrophobic material is subjected to stripping to remove the bitumen from the hydrophobic material.

8. A method as claimed in claim 1, wherein the composition agitated consists essentially of the stock, the water, the solid hydrophobic material, the surface active agent and the bitumen.

9. The method of claim 1, wherein said solid hydrophobic material has a shape and size such that the solid hydrophobic material can be readily separated from the wastepaper stock at the end of said method.

* * * * *